(12) United States Patent
Ikeda et al.

(10) Patent No.: US 10,359,267 B2
(45) Date of Patent: Jul. 23, 2019

(54) BEHAVIOR INSPECTION APPARATUS AND BEHAVIOR INSPECTION METHOD FOR EXTENSIBLE FLEXIBLE PIPE JOINT

(71) Applicants: THE VICTAULIC COMPANY OF JAPAN LIMITED, Tokyo (JP); NIHON SUIDO CONSULTANTS CO., LTD., Tokyo (JP)

(72) Inventors: Shintaro Ikeda, Kobe (JP); Yuji Noda, Kusatsu (JP); Isamu Funakoshi, Kusatsu (JP)

(73) Assignees: THE VICTAULIC COMPANY OF JAPAN LIMITED, Tokyo (JP); NIHON SUIDO CONSULTANTS CO., LTD., Tokyo (JP)

( * ) Notice: Subject to any disclaimer, the term of this patent is extended or adjusted under 35 U.S.C. 154(b) by 151 days.

(21) Appl. No.: 15/550,945

(22) PCT Filed: Dec. 24, 2015

(86) PCT No.: PCT/JP2015/086083
§ 371 (c)(1),
(2) Date: Aug. 14, 2017

(87) PCT Pub. No.: WO2016/129191
PCT Pub. Date: Aug. 18, 2016

(65) Prior Publication Data
US 2018/0045499 A1    Feb. 15, 2018

(30) Foreign Application Priority Data
Feb. 13, 2015   (JP) ................. 2015-026943

(51) Int. Cl.
*G01B 5/30*   (2006.01)
*G01B 5/02*   (2006.01)
(Continued)

(52) U.S. Cl.
CPC ............... *G01B 5/30* (2013.01); *F16L 27/08* (2013.01); *F16L 27/1021* (2013.01);
(Continued)

(58) Field of Classification Search
CPC ........................................... G01B 5/30
(Continued)

(56) References Cited

U.S. PATENT DOCUMENTS 2,108,077 A * 2/1938 Robinson ........... B23K 37/0533
219/161
4,375,724 A * 3/1983 Brock ...................... G01B 5/24
33/529
(Continued)

FOREIGN PATENT DOCUMENTS

JP     S49-35055 A    4/1974
JP     H02-38901 A    2/1990
(Continued)

OTHER PUBLICATIONS

Mar. 29, 2016 Search Report issued in International Patent Application No. PCT/JP2015/086083.

*Primary Examiner* — George B Bennett
(74) *Attorney, Agent, or Firm* — Oliff PLC

(57) ABSTRACT

A behavior inspection apparatus includes: a first measurement tool group including a set of first measurement tools each of which measures a first distance change amount that is a change amount of a distance between a first pipe position in the first pipe and a first reference position of a sleeve of the extensible flexible pipe joint; and a second measurement tool group including a set of second measurement tools each of which measures a second distance change amount that is a change amount of a distance between a second pipe poison in the second pipe and a second reference position of the sleeve. The first and second measurement tools are arranged (Continued)

at different positions in a circumferential direction of the sleeve. Displacement positions of the first and second pipes with respect to the joint are computed based on the measurement data by the first and second measurement tool groups.

16 Claims, 10 Drawing Sheets

(51) Int. Cl.
    *F16L 27/08*     (2006.01)
    *G01B 7/02*     (2006.01)
    *G01B 7/16*     (2006.01)
    *F16L 27/10*     (2006.01)
    *F16L 27/12*     (2006.01)

(52) U.S. Cl.
    CPC ............... *F16L 27/12* (2013.01); *G01B 5/02* (2013.01); *G01B 7/02* (2013.01); *G01B 7/16* (2013.01)

(58) Field of Classification Search
    USPC .......................................................... 33/529
    See application file for complete search history.

(56) References Cited

U.S. PATENT DOCUMENTS

| | | | | |
|---|---|---|---|---|
| 4,586,264 A | * | 5/1986 | Zatezalo | G01B 5/25 33/412 |
| 6,227,577 B1 | * | 5/2001 | Ikeda | F16L 17/04 285/112 |
| 8,282,136 B2 | * | 10/2012 | Vandal | F16L 17/04 285/112 |
| 2002/0088132 A1 | * | 7/2002 | Byrnes | G01B 3/563 33/529 |
| 2005/0018205 A1 | | 1/2005 | Braasch et al. | |
| 2012/0151743 A1 | * | 6/2012 | Sangel | E21B 17/01 29/464 |
| 2012/0256416 A1 | * | 10/2012 | Ikeda | F16L 17/04 285/365 |
| 2014/0097613 A1 | * | 4/2014 | Ikeda | F16L 27/026 285/302 |

FOREIGN PATENT DOCUMENTS

| | | |
|---|---|---|
| JP | H03-285137 A | 12/1991 |
| JP | 3058366 U | 6/1999 |
| JP | 2004-10355 A | 1/2004 |
| JP | 2004-53317 A | 2/2004 |
| JP | 2005-506543 A | 3/2005 |
| JP | 2005-91215 A | 4/2005 |
| JP | 2007-303548 A | 11/2007 |
| JP | 2009-210095 A | 9/2009 |
| WO | 03/036226 A1 | 5/2003 |

* cited by examiner

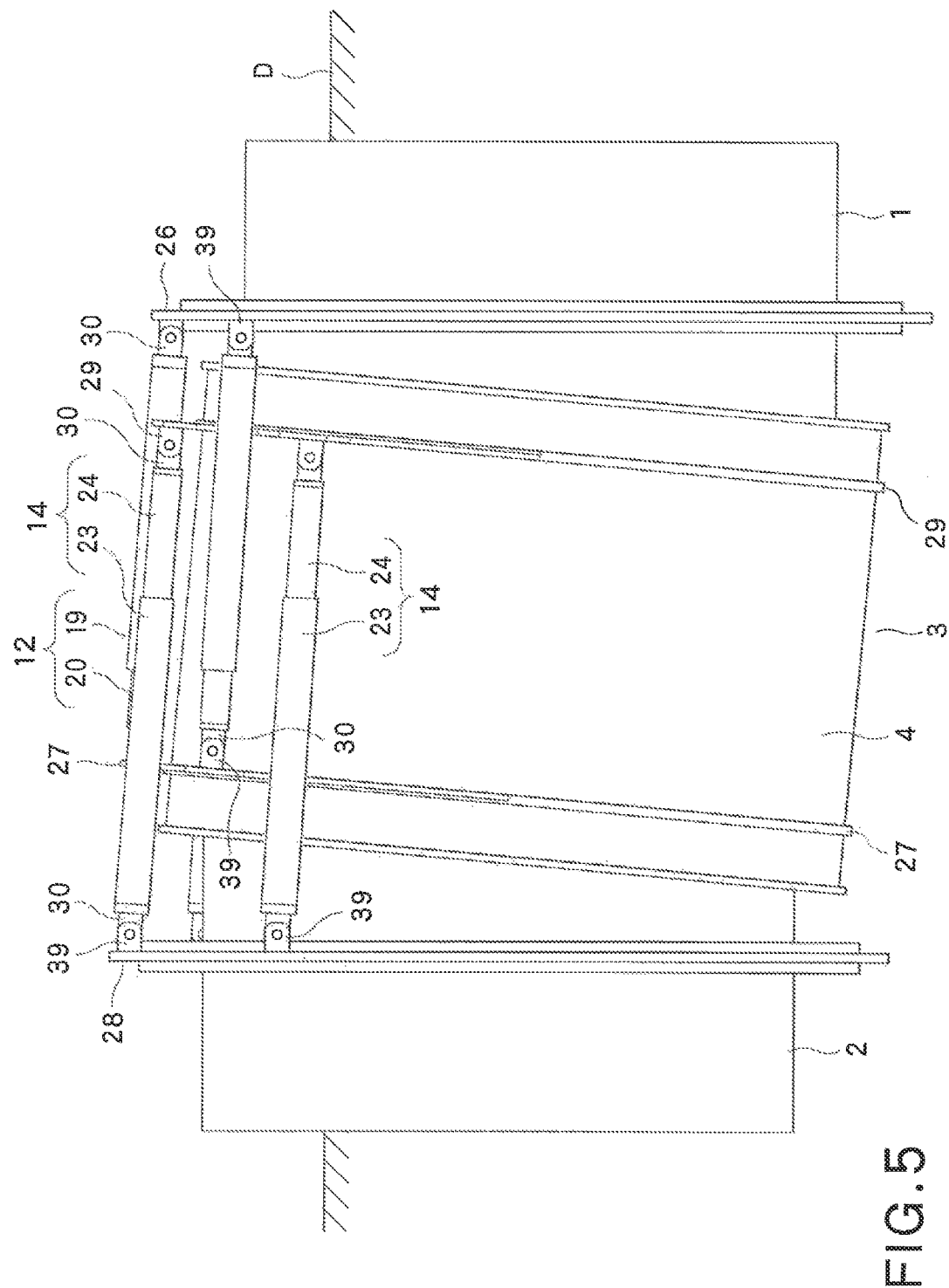
F I G. 5

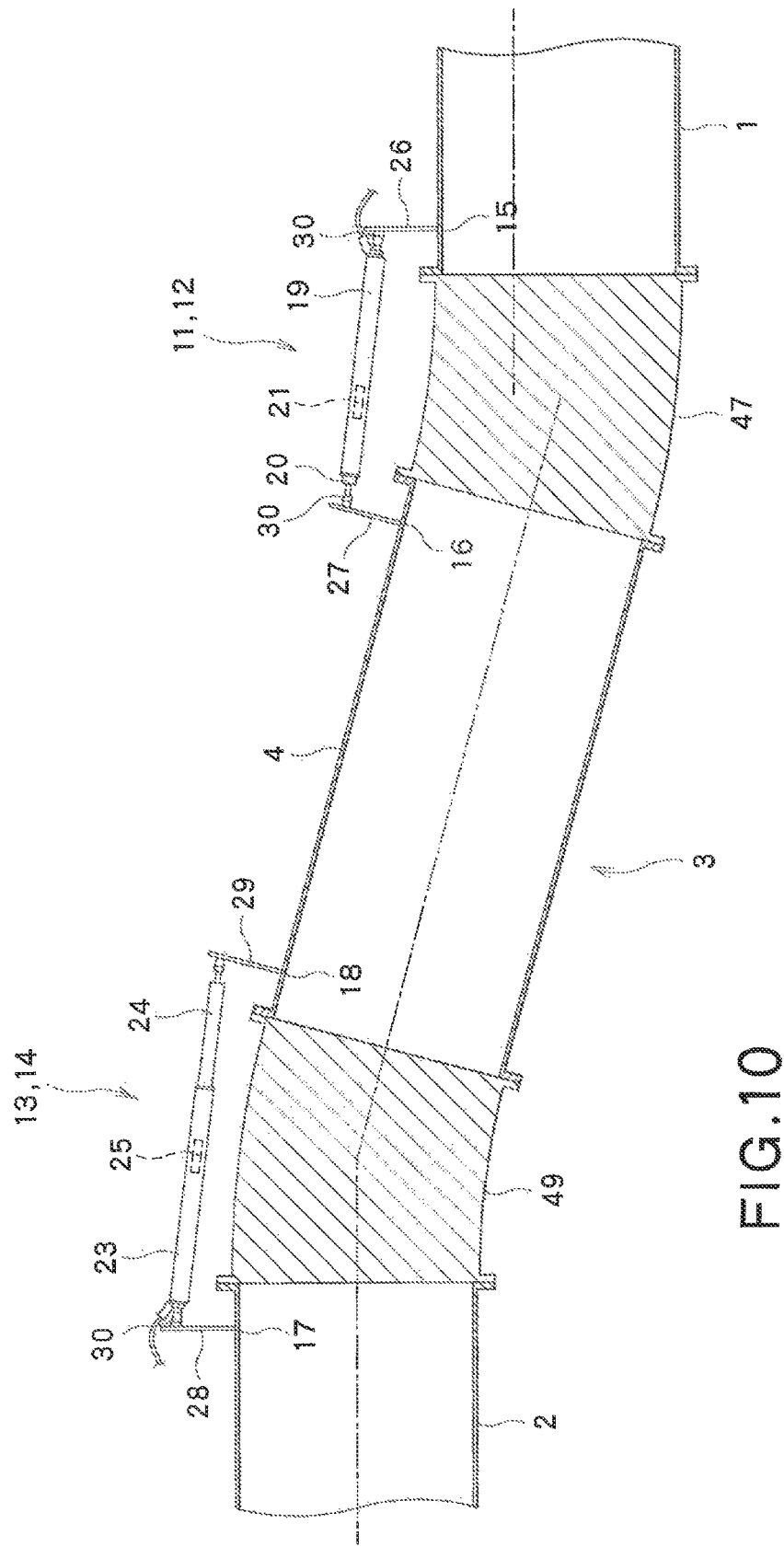

BEHAVIOR INSPECTION APPARATUS AND BEHAVIOR INSPECTION METHOD FOR EXTENSIBLE FLEXIBLE PIPE JOINT

TECHNICAL FIELD

The present invention relates to a behavior inspection apparatus and a behavior inspection method for an extensible flexible pipe joint. More particularly, the present invention relates to a behavior inspection apparatus and a behavior inspection method for an extensible flexible pipe joint, capable of judging necessity of repair or replacement of the extensible flexible pipe joint.

BACKGROUND ART

A duct formed by connecting a first pipe and a second pipe to both sides of an extensible flexible pipe joint is embedded in the ground, and a fluid is transferred, for example, waste water is discharged and so on.

With the passage of time, positions of the first pipe and the second pipe with respect to the extensible flexible pipe joint may be possibly slipped (displaced) from the original embedded positions, because the duct in the ground is subjected to an earthquake influence or the like. Because of this unavoidable positional slippages of the first pipe and the second pipe with respect to the extensible flexible pipe joint, the first pipe and/or the second pipe may be detached from the extensible flexible pipe joint so that they do not constitute a normal duct.

Thus, the first pipe and the second pipe are preferably maintained/repaired or replaced, before the positional slippage of the first pipe or the second pipe becomes excessively serious.

To this end, it is necessary to monitor the positional relationships of the first pipe and the second pipe with respect to the extensible flexible pipe joint occasionally or periodically.

Conventionally, in order to monitor the positional relationships of the first pipe and the second pipe with respect to the extensible flexible pipe joint, the embedded extensible flexible pipe joint is exposed as a whole by digging up the ground, and the positional relationships of the first pipe and the second pipe with respect to the extensible flexible pipe joint is inspected.

Instead of digging up the ground to expose the embedded extensible flexible pipe joint for inspection, the following method is proposed. Namely, a plurality of wires inserted through tubes are used. Respective ends of the wires are connected at intervals around the extensible flexible pipe joint, and the other ends are drawn up to the ground. By mechanically measuring a displacement of the wire with respect to the tube, the positional relationships among the extensible flexible pipe joint and so on are inspected.

However, when the plurality of wires are used, this method is unreliable because there are some problems in that the tubes in the ground are deteriorated, relative movement between the wire and the tube cannot be smoothly conducted because of sands or dusts which enter a space between the wire and the tube, and so on. In addition, since information about slippage data of the relative positional relationship between the wire and the tube is mechanically detected as a mechanical displacement amount of the wire itself, the method is unreliable and efficient measurement cannot be achieved.

Patent Document 1: JP03-285137A
Patent Document 2: JP2005-091215A
Patent Document 3: JP2004-053317A
Patent Document 4: JP2004-010355A

DISCLOSURE OF THE INVENTION

The object of the present invention is to solve the above problems of the prior art, and to provide a behavior inspection apparatus and a behavior inspection method for an extensible flexible pipe joint, capable of electrically detecting positional relationships of a first pipe and a second pipe with respect to the extensible flexible pipe joint reliably.

In order to achieve the object, the behavior inspection apparatus for an extensible flexible pipe joint according to the present invention is a behavior inspection apparatus for an extensible flexible pipe joint connecting a first pipe and a second pipe and including a sleeve, the behavior inspection apparatus comprising: a first measurement tool group including a set of first measurement tools each of which measures a first distance change amount that is a change amount of a distance between a first pipe position in the first pipe and a first reference position of the sleeve of the extensible flexible pipe joint; and a second measurement tool group including a set of second measurement tools each of which measures a second distance change amount that is a change amount of a distance between a second pipe poison in the second pipe and a second reference position of the sleeve; characterized in that: the first measurement tool includes a first cylinder whose one end is attached to the first pipe position, a first cylinder receiver whose one end is attached to the first reference position and whose the other end is telescopically moved with respect to the other end of the first cylinder, and a first sensor which electrically measures the first distance change amount based on a telescopic degree of the first cylinder with respect to the first cylinder receiver and transmits measurement data; and the second measurement tool includes a second cylinder whose one end is attached to the second pipe position, a second cylinder receiver whose one end is attached to the second reference position and whose the other end is telescopically moved with respect to the other end of the second cylinder, and a second sensor which electrically measures the second distance change amount based on a telescopic degree of the second cylinder with respect to the second cylinder receiver and transmits measurement data; the plurality of first measurement tools constituting the first measurement tool group are arranged at different positions in a circumferential direction of the sleeve, and the plurality of second measurement tools constituting the second measurement tool group are arranged at different positions in the circumferential direction of the sleeve; and displacement positions of the first pipe and the second pipe with respect to the extensible flexible pipe joint are computed based on the measurement data by the plurality of first sensors of the first measurement tool group and on the measurement data by the plurality of second sensors of the second measurement tool group.

In addition, when the first pipe and the second pipe are connected by the extensible flexible pipe joint, the first measurement tool group and the second measurement tool group are installed.

In addition, when the first pipe and the second pipe have been previously connected by the extensible flexible pipe joint, the first measurement tool group and the second measurement tool group are installed afterwards.

In addition, the first cylinder and the first cylinder receiver is attached respectively to the first pipe and the sleeve through universal joints, and the second cylinder and the second cylinder receiver is attached respectively to the second cylinder and the sleeve through universal joints.

In addition, the first sensor and the second sensor are either sensors of a slide resistance type or sensors of a differential transformer type.

In addition, the first sensor and the second sensor transmit the measurement data through a wire.

In addition, the first sensor and the second sensor transmit the measurement data wirelessly.

In addition, a seal member is interposed between the sleeve and the first pipe, and a seal member is interposed between the sleeve and the second pipe.

In addition, the sleeve is disposed on an outer circumference of a flexible pipe body connected to the first pipe and the second pipe.

In addition, the first pipe and the sleeve are connected through a first coupling pipe, and the second pipe and the sleeve are connected through a second coupling pipe.

In addition, the first pipe and the sleeve are connected through a first flexible pipe, and the second pipe and the sleeve are connected through a second flexible pipe.

In addition, an observer is connected to the first sensor and the second sensor, the observer receiving the measurement data from the first sensor and the second sensor and feeding electricity to the first sensor and the second sensor.

In addition, a monitor is connected to the observer, the monitor receiving the measurement data from the observer.

In addition, the behavior inspection method for an extensible flexible pipe joint according to the present invention is a behavior inspection method for an extensible flexible pipe joint connecting a first pipe and a second pipe and including a sleeve, the behavior inspection method comprising: preparing a first measurement tool group including a set of first measurement tools each of which measures a first distance change amount that is a change amount of a distance between a first pipe position in the first pipe and a first reference position of the sleeve of the extensible flexible pipe joint, and a second measurement tool group including a set of second measurement tools each of which measures a second distance change amount that is a change amount of a distance between a second pipe poison in the second pipe and a second reference position of the sleeve; and arranging and attaching the plurality of first measurement tools constituting the first measurement tool group at different positions in a circumferential direction of the sleeve, and arranging and attaching the plurality of second measurement tools constituting the second measurement tool group at different positions in the circumferential direction of the sleeve; characterized in that: the first measurement tool includes a first cylinder whose one end is attached to the first pipe position, a first cylinder receiver whose one end is attached to the first reference position and whose the other end is telescopically moved with respect to the other end of the first cylinder, and a first sensor which electrically measures the first distance change amount based on a telescopic degree of the first cylinder with respect to the first cylinder receiver and transmits measurement data, and the second measurement tool includes a second cylinder whose one end is attached to the second pipe position, a second cylinder receiver whose one end is attached to the second reference position and whose the other end is telescopically moved with respect to the other end of the second cylinder, and a second sensor which electrically measures the second distance change amount based on a telescopic degree of the second cylinder with respect to the second cylinder receiver and transmits measurement data; and displacement positions of the first pipe and the second pipe with respect to the extensible flexible pipe joint are computed based on the measurement data by the plurality of first sensors of the first measurement tool group and on the measurement data by the plurality of second sensors of the second measurement tool group.

In addition, when the first pipe and the second pipe are connected by the extensible flexible pipe joint, the first measurement tool group and the second measurement tool group are installed and attached.

In addition, when the first pipe and the second pipe have been previously connected by the extensible flexible pipe joint, only an upper part of the extensible flexible pipe joint, the first pipe and the second pipe close to the ground surface are exposed, and the first measurement tool group and the second measurement tool group are installed and attached afterwards.

According to the structure of the present invention, the plurality of first measurement tools constituting the first measurement tool group are arranged at different positions in the circumferential direction of the sleeve, and the plurality of second measurement tools constituting the second measurement tool group are arranged at different positions in the circumferential direction of the sleeve. Displacement positions of the first pipe and the second pipe with respect to the extensible flexible pipe joint are computed by measurement data by the plurality of first sensors of the first measurement tool group and on measurement data by the plurality of second sensors of the second measurement tool group. Thus, positional relationships of the first pipe and the second pipe with respect to the extensible flexible pipe joint can be electrically measured reliably, whereby it is possible to adequately judge necessity of repair and replacement of the extensible flexible pipe joint

BRIEF DESCRIPTION OF THE DRAWINGS

FIG. 5 is a view showing another embodiment of the present invention.

FIG. 10 is a view schematically explaining a structure of the behavior inspection apparatus for an extensible flexible pipe joint according to a fifth embodiment.

DESCRIPTION OF THE PREFERRED EMBODIMENTS

First Embodiment

A first embodiment of a behavior inspection apparatus for an extensible flexible pipe joint according to the present invention is described herebelow with reference to the drawings.

Figure 1:
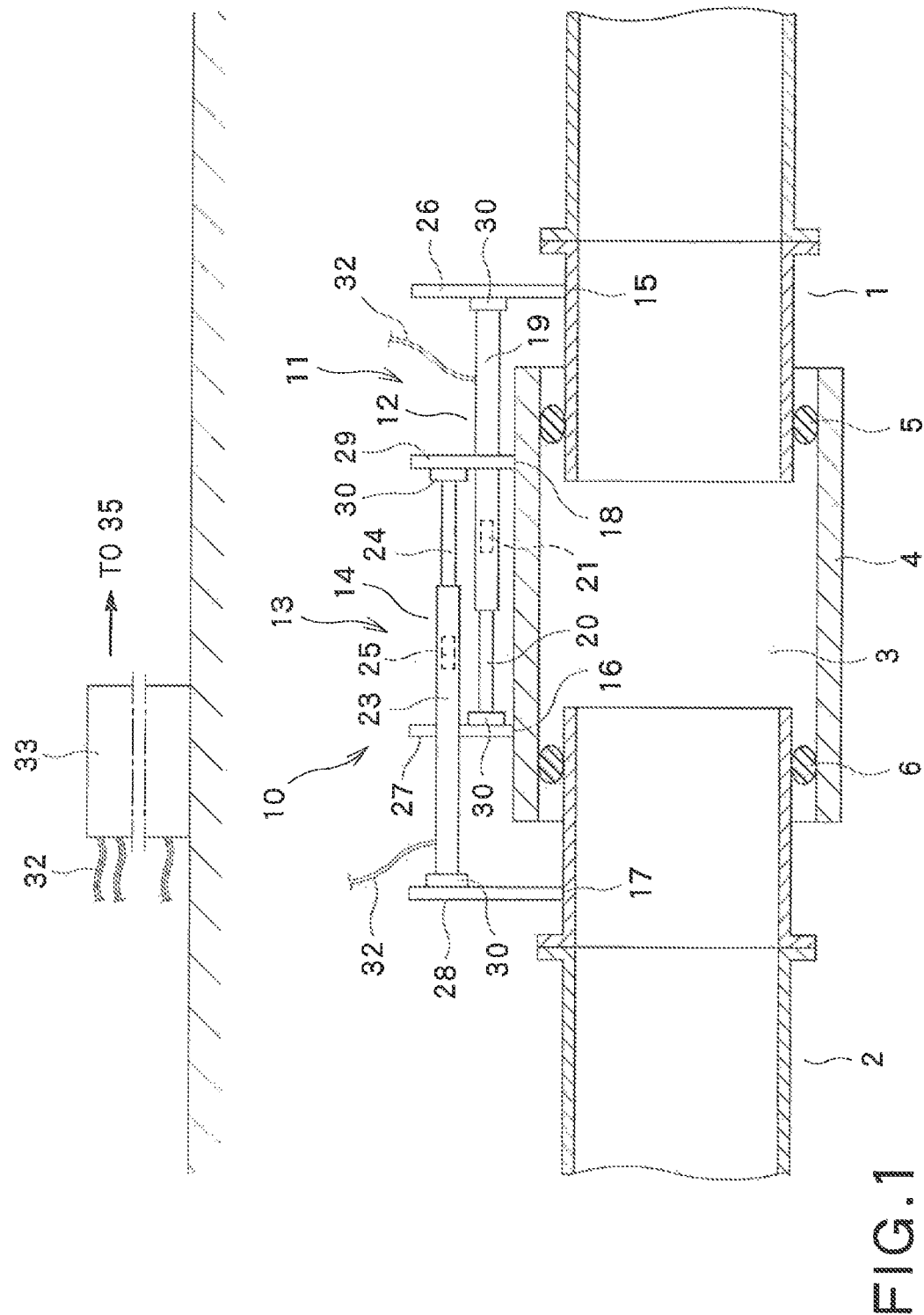
FIG. 1 is a view schematically explaining a structure of a behavior inspection apparatus for an extensible flexible pipe joint according to a first embodiment.

As shown in FIG. 1, a duct in which a first pipe 1 and a second pipe 2 are connected by an extensible flexible pipe joint 3 is embedded in the ground. The first pipe 1 and the second pipe 2 are each composed of a flange part inserted into the extensible flexible pipe joint 3, and a body pipe connected to the flange part. The extensible flexible pipe joint 3 includes a cylindrical sleeve 4, and ring-like seal members 5 and 6 disposed on both ends of the sleeve 4. The seal members 5 and 6 are arranged such that a gap is formed between an outer circumferential wall surface of each of the first pipe 1 and the second pipe 2 and an inner circumferential surface of the sleeve 4. The first pipe 1 and the second pipe 2 are connected through these gaps, in such a manner that inclination and/or bending thereof with respect to the sleeve 4 are allowed.

In addition, the first pipe 1 and the second pipe 2 are connected through the seal members 5 and 6 so as to be extensible and contractable with respect to an axial direction of the sleeve 4. The sleeve 4 is made of a hard pipe body, but may be made of a flexible pipe body.

Next, a behavior inspection apparatus 10 for the extensible flexible pipe joint 3, which electrically detects positional relationships of the first pipe 1 and the second pipe 2 with respect to the extensible flexible pipe joint 3, is described.

The behavior inspection apparatus 10 includes a first measurement tool group 11 having a set of first measurement tools 12, and a second measurement tool group 13 having a set of second measurement tools 14.

In FIG. 1, as the plurality of first measurement tools 12 constituting the first measurement tool group 11 and as the plurality of second measurement tools 14 constituting the second measurement tool group 13, only one measurement tool 12 and only one measurement tool 14 are shown. In the actual apparatus, a plurality of, e.g., four first measurement tools 12 are arranged at equal intervals therebetween in a circumferential direction of the extensible flexible pipe joint 3, the first pipe 1 and the second pipe 2. Similarly, a plurality of, e.g., four second measurement tools 14 are arranged at equal intervals therebetween in the circumferential direction. The number of first measurement tools 12 constituting the first measurement tool group 11 must be three or more. As long as the circumferential arrangement positions are determined, it is not necessary for the measurement tools to be at angularly equal intervals therebetween.

The first measurement tool 12 measures a first distance change amount V1 that is a change amount of a distance between a first pipe position 15 in the first pipe 1 and a first reference position 16 of the sleeve 4 of the extensible flexible pipe joint 3. The second measurement tool 14 measures a second distance change amount V2 that is a change amount of a distance between a second pipe position 17 in the second pipe 2 and a second reference position 18 of the sleeve. The first reference position 16 and the second reference position 18 of the sleeve 4 of the extensible flexible pipe joint 3 are located at ring positions of a plane perpendicular to an axis line of the sleeve 4, and their position data on the sleeve 4 have been already known.

The first measurement tool 12 includes a first cylinder 19 whose one end is attached to the first pipe position 15, a first cylinder receiver 20 whose one end is attached to the first reference position 16 and whose the other end is telescopically moved with respect to the other end of the first cylinder 19, and a first sensor 21 (see FIG. 2) which electrically measures the first distance change amount V1 based on a telescopic degree of the first cylinder 19 with respect to the first cylinder receiver 20 and transmits measurement data.

The second measurement tool 14 includes a second cylinder 23 whose one end is attached to the second pipe position 17, a second cylinder receiver 24 whose one end is attached to the second reference position 18 and whose the other end is telescopically moved with respect to the other end of the second cylinder 23, and a second sensor 25 which electrically measures the second distance change amount V2 based on a telescopic degree of the second cylinder 23 with respect to the second cylinder receiver 24 and transmits measurement data.

An annular part 26 of an annular plate shape is disposed on an outer circumference of the first pipe position 15 of the first pipe 1, and an annular part 27 of an annular plate shape is disposed on an outer circumference of the first reference position 16 of the sleeve 4. Similarly, an annular part 28 of an annular plate shape is disposed on an outer circumference of the the second pipe position 17 of the second pipe 2, and an annular part 29 of an annular plate shape is disposed on an outer circumference of the second reference position 18 of the sleeve 4. Universal joints 30 are attached to the annular parts 26, 27, 28 and 29. One end of the first cylinder 19 is attached to the annular part 26 through the universal joint 30. One end of the first cylinder receiver 20 is attached to the annular part 27 through the universal joint 30. One end of the second cylinder 23 is attached to the annular part 28 through the universal joint 30. One end of the second cylinder receiver 24 is attached to the annular part 29 through the universal joint 30. The universal joints 30 function in such a manner that the first cylinder 19, the first cylinder receiver 20, the second cylinder 23 and the second cylinder receiver 24 move to follow smoothly, precisely displacements of the first pipe 1 and the second pipe 2 with resect to the extensible flexible pipe joint 3. The first cylinder 19, the first cylinder receiver 20, the second cylinder 23 and the second cylinder receiver 24 are attached to the respective annular parts 26, 27, 28 and 29 through the universal joints 30. Thus, due to the universal joints 30, the first cylinder 19, the first cylinder receiver 20, the second cylinder 23 and the second cylinder receiver 24 can have right postures to maintain their telescopic relationship at all times. As a result, it is possible to obtain measurement data of the first distance change amount V1 and the second distance change amount V2.

The first sensor 21 and the second sensor 25 transmit the measurement data of the first distance change amount V1 and the second distance change amount V2 to an observer 33 installed on the ground through a cable 32 embedded in the ground.

In place of the cable 32, the first sensor 21 and the second sensor 25 can wirelessly transmit the measurement data of the first distance change amount V1 and the second distance change amount V2 to the observer 33.

The observer 33 computes an extension/contraction degree and an inclination degree of the first pipe 1 with respect to the extensible flexible pipe joint 3 based on the plurality of first distance change amounts V1 measured by the plurality of first measurement tools 12 constituting the first measurement tool group 11. Similarly, the observer 33 computes an extension/contraction degree and an inclination degree of the second pipe 2 with respect to the extensible flexible pipe joint 3 based on the plurality of second distance change amounts V2 measured by the plurality of second measurement tool 14 constituting the second measurement tool group 13.

As described below, the observer 33 may further transmit the measurement data from the observer 33 to a monitor 35, without computing the extension/contraction degree and the inclination degree of the first pipe 1 or the extension/contraction degree and the inclination degree of the second pipe 2 based on the first distance change amounts V1 or the second distance change amounts V2, and the monitor 35 may compute the extension/contraction degree and the inclination degree of the first pipe 1 or the extension/contraction degree and the inclination degree of the second pipe 2.

Since the plurality of first distance change amounts V1 are measurement data measured by the plurality of first measurement tools 12 arranged at different positions in the circumferential direction of the extensible flexible pipe joint 3 and the first pipe 1, the extension/contraction degree and the inclination degree can be easily computed based on the first distance change amounts V1 in accordance with an already known formula or an easily creatable formula. For example, since the first distance change amounts V1 measured by the respective first measurement tools 12 represent change amounts from the first reference position 16 of the sleeve 4 to which they are attached, an extension/contraction length and a bending direction of the first pipe 1 can be known by comparing the first distance change amounts V1 with angular position data of the circumference to which the respective first measurement tools 12 are attached. This holds true with the plurality of second distance change amounts V2.

These computations are carried out with the use of a pre-programmed computing equation. When an obtained computation result exceeds an allowable value or when it is judged that repair is recommended although the obtained computation result does not exceed the allowable value, the extensible flexible pipe joint 3 and the like is repaired. On the other hand, it is judged that repair is not needed or urgent based on the obtained computation result, the extensible flexible pipe joint 3 and the like can be safely left as they are until the next inspection.

Figure 2:
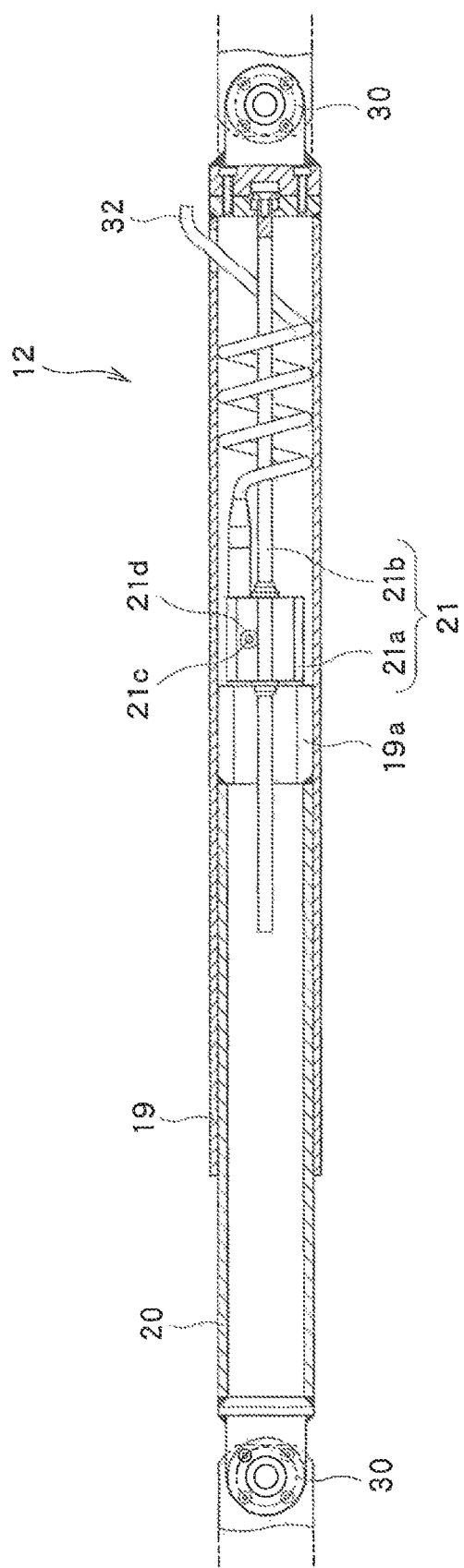
FIG. 2 is a view showing a structure of a first measurement tool (second measurement tool).

Next, the first measurement tool 12 is described with reference to FIG. 2. Since the second measurement tool 14 has the same structure as that of the first measurement tool 12, description thereof is omitted.

As described above, the first measurement tool 12 includes the first cylinder 19 whose one end is attached to the first pipe position 15, the first cylinder receiver 20 whose one end is attached to the first reference position 16 and whose the other end is telescopically moved with respect to the other end of the first cylinder 19, and the first sensor 21 which electrically measures the first distance change amount V1 based on a telescopic degree of the first cylinder 19 with respect to the first cylinder receiver 20 and transmits measurement data.

The first sensor 21 is sealed up, lest mud and/or water enter thereinto.

The first sensor 21 is a sensor of a known slide resistance type, and is composed of a sensor body 21*a* and the guide rod 21*b*. The sensor body 21*a* is attached to a holder 19*a* fixed on a distal end of the first cylinder 19. The holder 19*a* holds the sensor body 21*a* in a sealed manner so as to protect it from water and so on. The first cylinder 19, the holder 19*a* and the sensor body 21*a* are configured to move integrally with each other. The guide rod 21*b* has one end fixed to a root end of the first cylinder receiver 20, and its body extends inside the first cylinder 19 and the first cylinder receiver 20.

The sensor body 21*a* is held by the guide rod 21*b* in a movable manner such that the sensor body 21*a* is guided by the guide rod 21*b* to move. The sensor body 21*a* includes a transmission shaft 21*c* disposed in a direction perpendicular to an axis line of the guide rod 21*b*, a roller 21*d* integrally attached to the transmission shaft 21*c* so as to be slidably roll and move on a surface of the guide rod 21*b*, and a not-shown slide resistance disc integrally attached to the transmission shaft 21*c*. The slide resistance disc is configured such that its electrical resistance value is proportionate to a rotation amount about the transmission shaft 21*c*.

The sensor body 21*a* is moved integrally with the first cylinder 19, and the guide rod 21*b* is fixed on the first cylinder receiver 20. Thus, when the first cylinder 19 and the first cylinder receiver 20 are relatively displaced from each other, the roller 21*d* of the sensor body 21*a* slidably rolls and moves on the surface of the guide rod 21*b*, whereby the not-shown slide resistance disk rotates about the transmission shaft 21*c*. A slide resistance value can be detected from an obtained rotation amount of the slide resistance disk. Since the slide resistance value reflects an amount the roller 21*d* that slidably rolls and moves on the surface of the guide rod 21*b*, a relative displacement between the first cylinder 19 and the first cylinder receiver 20 can be known from the slide resistance value. The first distance change amount V1 based on the slide resistance value is transmitted outside through a cord 32.

Figure 3:
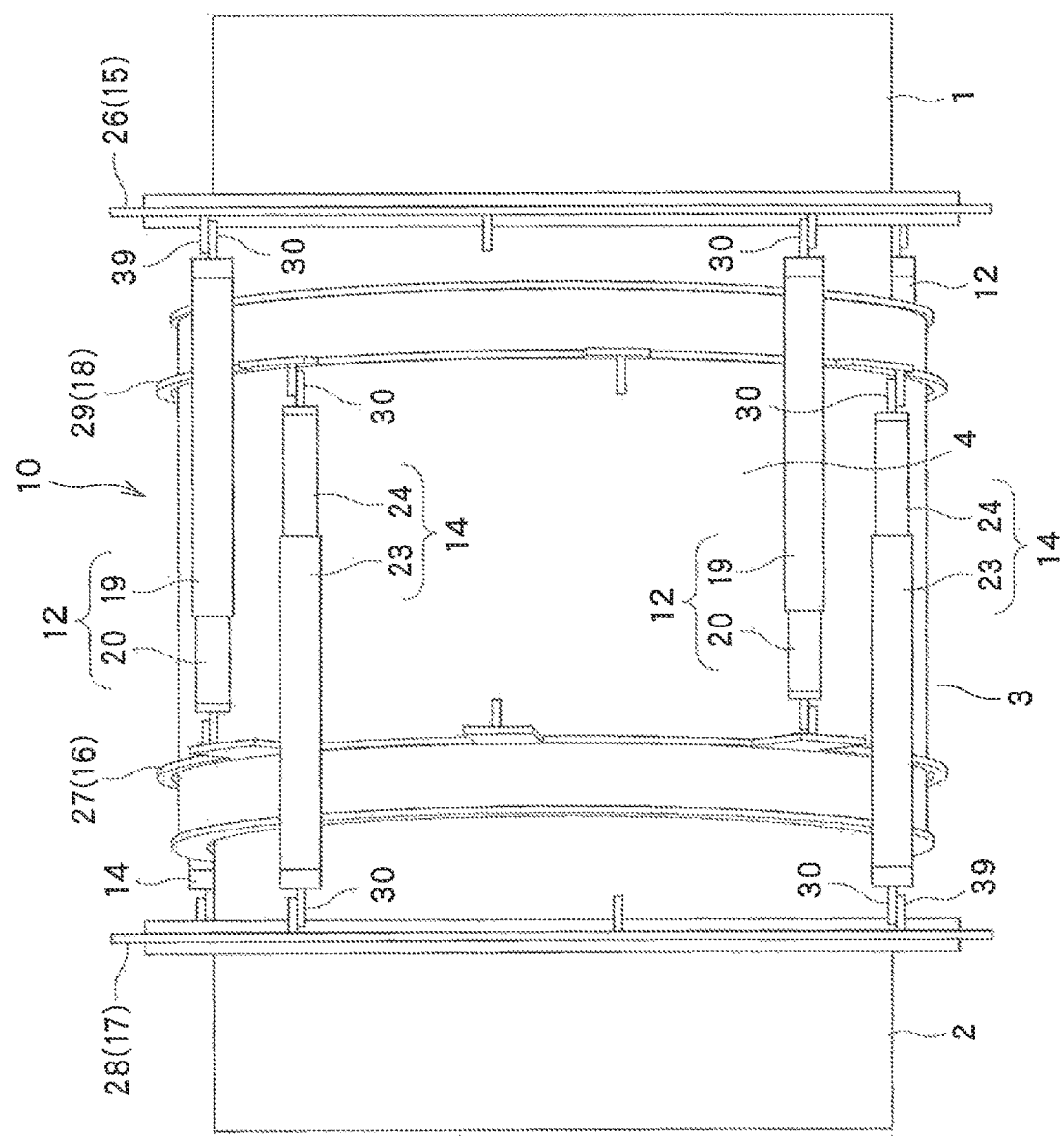
FIG. 3 is a view showing an embodiment of the present invention.
Figure 4:
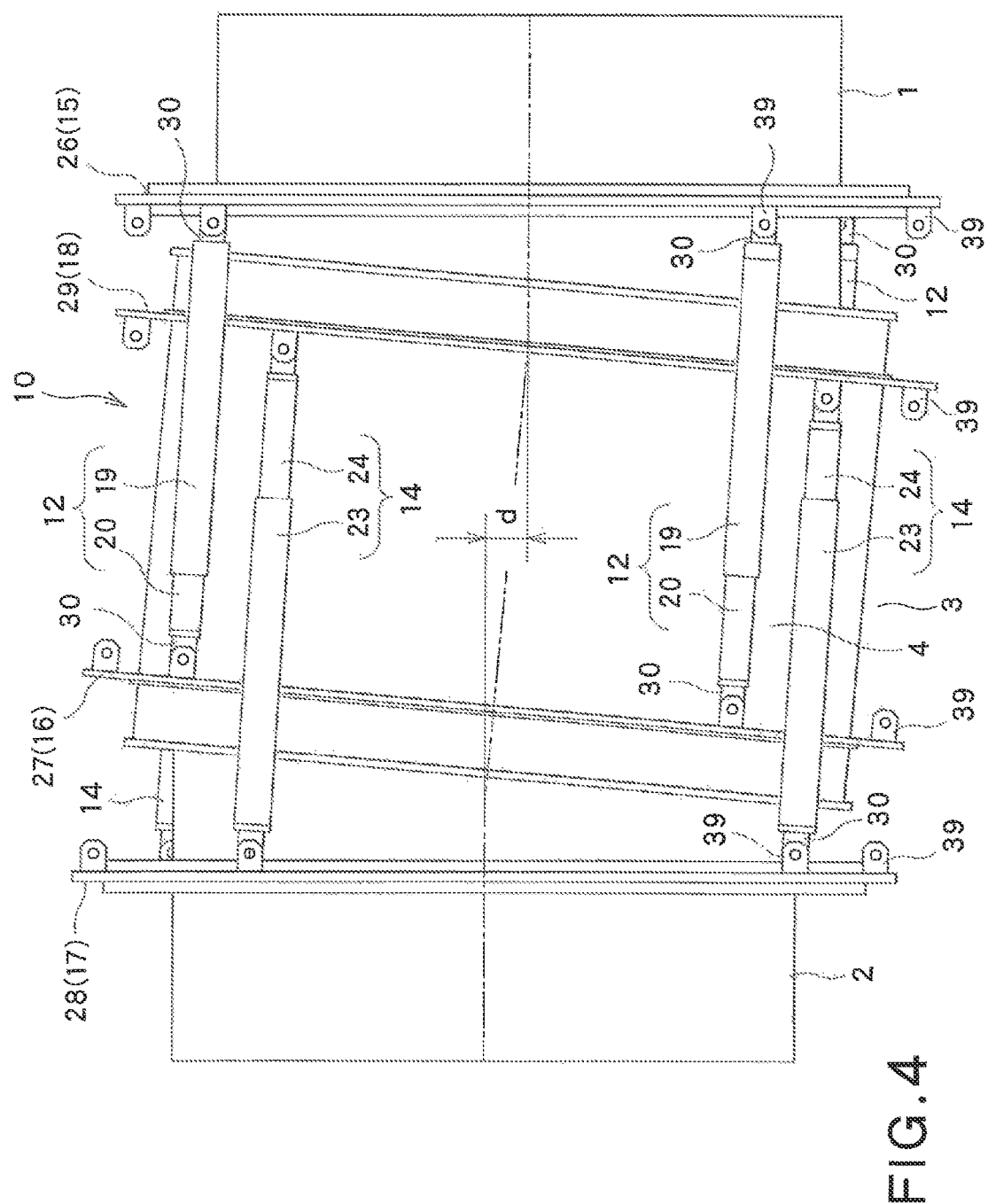
FIG. 4 is a view of the embodiment shown in FIG. 3 seen from above.

Next, FIGS. 3 and 4 show the behavior inspection apparatus 10 shown approximately to an actual behavior inspection apparatus in which the four first measurement tools 12 and the four second measurement tools 14 are installed. FIG. 3 is a perspective view in which the behavior inspection apparatus 10 is disposed in the right and left direction, and FIG. 4 is a perspective view of the behavior inspection apparatus 10 seen from above.

In an actual construction site, the behavior inspection apparatus 10 for the extensible flexible pipe joint 3 is installed in the following procedure. Firstly, the ground is dug up, and the first pipe 1 and the second pipe 2 are connected by the extensible flexible pipe joint 3. By means of the annular part 26, 27, 28 and 29 previously disposed on the first pipe 1, the second pipe 2 and the extensible flexible pipe joint 3, the four first measurement tools 12 and the four second measurement tools 14 are attached between the annular part 26, 27, 28 and 29. The four first measurement tools 12 and the four second measurement tools 14 are arranged at an angular interval of 90 degrees in the circumferential direction. As long as angular positions on the circumference on which the respective first measurement tools 12 and so on are located are known, the present invention is not limited to the circumferential angular interval of 90 degrees, and another angular position may be possible.

The example shown in FIGS. 3 and 4 shows a condition wherein some time has elapsed from when the first pipe 1 and the second pipe 2 were connected by the extensible flexible pipe joint 3, and a relative slippage such as bending occurs between the first pipe 1 and the second pipe 2. Immediately after the four measurement tools 12 and the four measurement tools 14 were attached, the first pipe 1 and the second pipe 2 were linearly connected by the extensible flexible pipe joint 3, not in the condition of FIG. 4 in which the first pipe 1 and the second pipe 2 are connected to each other in a bent matter. Each of the annular part 26, 27, 28 and 29 has an attachment means 39 for attachment of the first measurement tool 12, and the first measurement tool 12 and so on is attached to the attachment means 39 through the universal joint 30.

FIGS. 3 and 4 show the universal joint 30 in a simplified manner for easy understanding.

Measurement data of four first distance change amounts V1 measured by the four first measurement tools 12 and measurement data of four second distance change amounts V2 measured by the four second measurement tools 14 are transmitted to the observer 33 through the cord 32. The measurement data may be wirelessly transmitted to the observer 33.

The measurement data are suitably observed by the observer 33 once or twice a year or after an earthquake or the like takes place, for example. Since immediately after the four measurement tools 12 and the four measurement tools 14 are attached, the first pipe 1 and the second pipe 2 do not have any extension/contraction and bending, respectively, the four first distance change amounts V1 and the four second distance change amounts are zero.

After some time has elapsed from the installation, displacement positions of the first pipe 1 and the second pipe 2 with respect to the extensible flexible pipe joint 3 are computed. As the displacement positions, an extension/contraction amount of the first pipe 1 and an bending angle of the first pipe 1 with respect to the axis line of the extensible flexible pipe joint 3 can be computed based on the four first distance change amounts V1 at different positions on the circumference of the extensible flexible pipe joint 3. Similarly, an extension/contraction amount of the second pipe 2 and an bending angle of the second pipe 2 with respect to the axis line of the extensible flexible pipe joint 3 can be computed based on the four second distance change amounts V2. In addition, an axis-line shift amount d between the axis line of the first pipe 1 and the axis line of the second pipe 2 can be computed based on the bending angle of the first pipe 1 with respect to the axis line of the extensible flexible pipe joint 3 and the bending angle of the second pipe 2 with respect to the axis line of the extensible flexible pipe joint 3. Then, it is checked whether a result obtained by the computation, i.e., the extension/contraction amount of the first pipe 1 or the second pipe 2 exceeds an allowable extension/contraction amount of, e.g., 200 mm, and whether the axis-line shift amount d exceeds an allowable axis-line shift amount of, e.g., 100 mm. When it is found out that the computation result exceeds the allowable extension/contraction amount and the allowable axis-line shift amount, it is determined whether the extensible flexible pipe joint 3 is replaced with a new extensible flexible pipe joint, or the extensible flexible pipe joint 3 is repaired by a pipe joint repair apparatus, On the other hand, when it is found out that the computation result does not exceed the allowable extension/contraction amount and the allowable axis-line shift amount, it is possible to confirm that the extensible flexible pipe joint 3 can be continuously used.

As described above, according to the structure of the embodiment, positional relationships of the first pipe 1 and the second pipe 2 with respect to the extensible flexible pipe joint 3 can be electrically detected reliably. As a result, it is possible to adequately judge necessity of repair and replacement of the extensible flexible pipe joint.

Next, a second embodiment of the present invention is described with reference to FIGS. 5 and 6. In the above embodiment, the first measurement tool group 11 and the second measurement tool group 13 are installed simultaneously when the construction work for connecting the first pipe 1 and the second pipe 2 by the extensible flexible pipe joint 3 is carried out. On the other hand, in this embodiment, in a case where the first pipe 1 and the second pipe 2 have been previously connected by the extensible flexible pipe joint 3 without an apparatus corresponding to the behavior inspection apparatus 10 being installed, the first measurement tool group 11 and the second measurement tool group 13 are arranged afterwards, so that positional relationships of the first pipe 1 and the second pipe 2 with respect to the extensible flexible pipe joint 3 can be detected afterwards.

In order that extension/contraction amounts of the first pipe 1 and the second pipe 2 and bending angles of the first pipe 1 and the second pipe 2 with respect to the axis line of the extensible flexible pipe joint 3 can be computed, it is necessary that the first measurement tool group 11 and the second measurement tool group 13 respectively have at least three first measurement tools 12 and at least three second measurement tools 14 which are located at different positions on the circumference.

Thus, firstly, as shown in FIG. 5, the ground is dug up until an upper part of the extensible flexible pipe joint 3, the first pipe 1 and the second pipe 2 is exposed. The symbol D represents a level of the ground that is dug up. The ground level D is a surface of the ground that is dug up such that the minimal three first measurement tools 12a and the minimal three second measurement tools 14 can be attached. The three first measurement tools 12 and the three second measurement tools 14 are attached to an upper circumferential part of the extensible flexible pipe joint 3, the first pipe 1 and the second pipe 2, which are exposed above the ground level D. For the purpose of accuracy of measurement data, the ground is dug up as deep as possible, and a plurality of, e.g., three first measurement tools 12 and the three second measurement tools 14 are preferably attached to cover a 360-degree angular range as a whole as much as possible, but it is difficult to dig up the ground so deeply. Thus, as described above, the measurement tools are locally arranged at different positions of the upper circumferential part. However, judgment information sufficient for judging necessity of repair and replacement can be obtained.

Measurement data of three first distance change amounts V1 measured by the three first measurement tools 12 and measurement data of three second distance change amounts V2 measured by the three second measurement tools 14 are transmitted to the observer 33 installed on the ground through the cord 32 or wirelessly.

Figure 6:
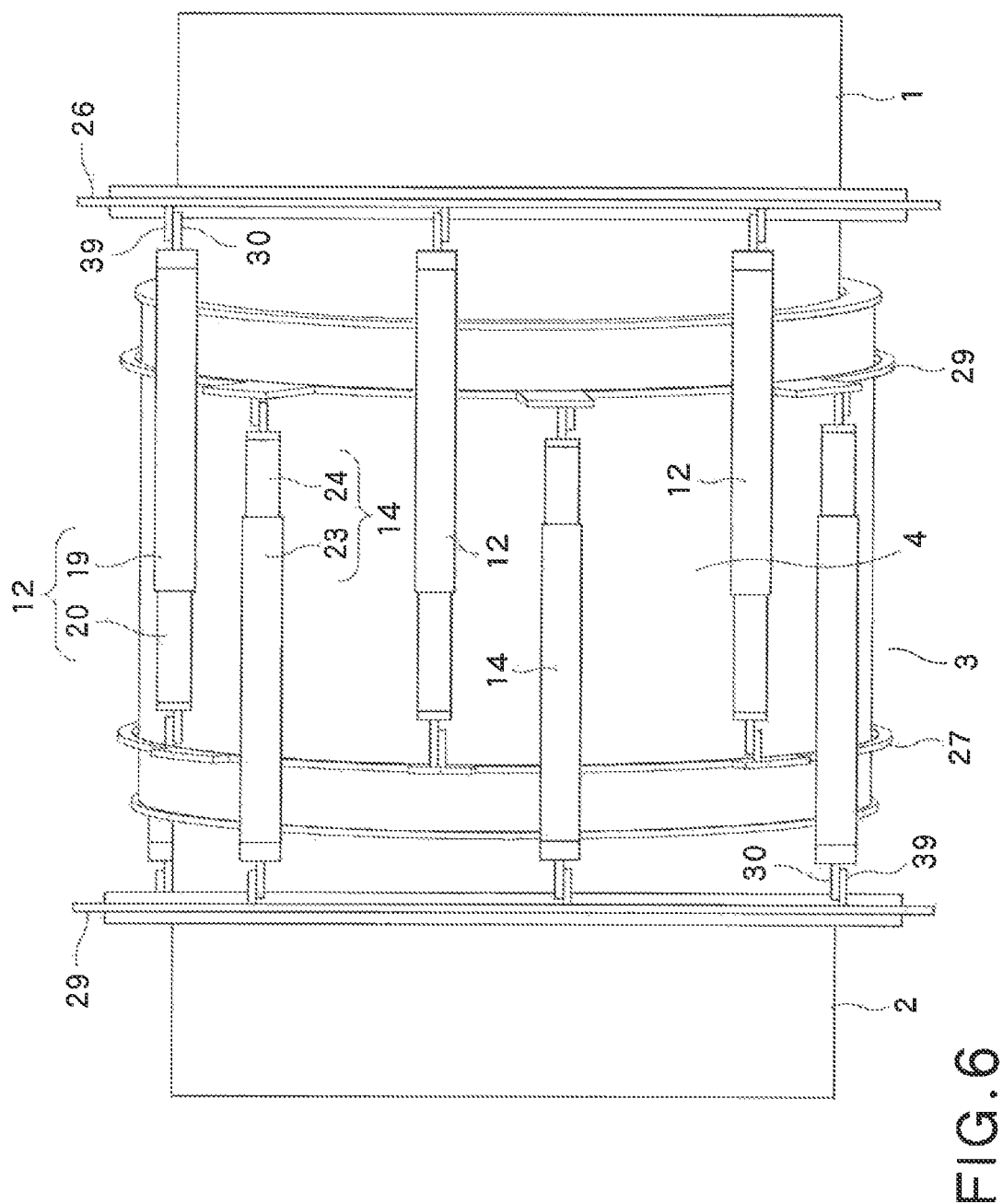
FIG. 6 is a view of the embodiment shown in FIG. 5 seen from above.

Although FIGS. 5 and 6 show the annular parts 26, 27, 28 and 29 and the attachment means 39, they may not be possibly provided on the extensible flexible pipe joint 3 and so on in advance. In this case, members functioning as the annular parts 26 and so on and the attachment means 39 may be attached by welding or the like on site.

According to the structure of this embodiment, even when an apparatus corresponding to the behavior inspection apparatus 10 is not originally installed, at least three first measurement tools 12 and at least three second measurement tools 14 are attached to the extensible flexible pipe joint 3 and so on afterwards, whereby it is possible to detect and monitor positional relationships of the first pipe 1 and the second pipe 2 with respect to the extensible flexible pipe joint 3 later. As a result, it is possible to adequately judge necessity of repair and replacement of extensible flexible pipe joint 3.

Next, a behavior inspection method for an extensible flexible pipe joint according to the present invention is described.

Firstly, the first measurement tool group 11 including a set of the first measurement tools 12, and the second measurement tool group 13 including a set of the second measurement tools 14 are prepared.

Then, the plurality of first measurement tools 12 constituting the first measurement tool group 11 are arranged at different positions in the circumferential direction of the sleeve 4, and attached thereto by means of the annular parts 26 and 27 and the universal joints 30. The plurality of second measurement tools 14 constituting the second measurement tool group 13 are arranged at different positions in the circumferential direction of the sleeve 4, and attached thereto by means of the annular parts 28 and 29 and the universal joints 30.

Then, the observer 33 computes, by using a program created by a known programming method, displacement positions of the first pipe 1 and the second pipe 2 with respect to the extensible flexible pipe joint 3 based on measurement data by the plurality of first sensors 21 of the first measurement tool group 11 and measurement data by the plurality of second sensors of the second measurement tool group 13. Thereafter, based on the computed inspection result, necessity of repair and replacement of the extensible flexible pipe joint 3 is judged.

In addition, when the first pipe 1 and the second pipe 2 are connected newly by the extensible flexible pipe joint 3, the first measurement tool group 11 and the second measurement tool group 13 are arranged and attached simultaneously with the connection of the first pipe 1 and the second pipe 2 by the extensible flexible pipe joint 3.

Alternatively, when the first pipe 1 and the second pipe 2 have been previously connected by the extensible flexible pipe joint 3, the ground is dug up so that only an upper part of the extensible flexible pipe joint 3, the first pipe 1 and the second pipe 2 near the ground surface is exposed. The first measurement tool group 11 and the second measurement tool group 13 are arranged and attached to the exposed upper part afterwards.

When the measurement data are transmitted through a wire, the cable 32 is installed. When the measurement data are transmitted wirelessly, the first sensors 21 and so on and the observer 33 are configured to be capable of transmitting the measurement data wirelessly, so that the measurement data can be transmitted wirelessly.

As described above, according to the behavior inspection method for an extensible flexible pipe joint according to the present invention, it is possible to detect and monitor positional relationships of the first pipe 1 and the second pipe 2 with respect to the extensible flexible pipe joint 3. As a result, it is possible to adequately judge necessity of repair and replacement of extensible flexible pipe joint 3.

In the above description, the sensor of a slide resistance type is taken by example as the first sensor 21, and described with reference to FIG. 2. However, not limited to the sensor of a slide resistance type, the first sensor 21 that electrically measures the first distance change amount V1 may be of another type, as long as it electrically measures the first distance change amount V1 based on a telescopic degree of the first cylinder 19 with respect to the first cylinder receiver 20. For example, the first sensor 21 may be a sensor of a differential transformer type.

In the case of a sensor of a differential transformer type, for example, the first sensor 21 includes a coil part secured on the distal end of the first cylinder 19, and an iron core part disposed on a bar-like part fixed on one end of the first cylinder receiver 20. The coil part is composed of one primary coil and two secondary coils that are arranged in series symmetrically with each other. The primary coil is driven by a drive transmitter, and mutual conductances of the two secondary coils with respect to the primary coil are configured to be equal, and the coils are wound such that phases differ from each other at 180 degrees. When the iron core part is located at a central position between the two secondary coils, since induced voltages induced in the two secondary coils are equal and their phases are reverse, an output voltage is zero. When the first cylinder 19 and the first cylinder receiver 20 are relatively slid so that the iron core part is relatively displaced from the central position between the two secondary coils, an induced voltage of one of the secondary coils decreases while an induced voltage of the other secondary coil increases. Thus, a voltage corresponding to a difference between the induced voltages of them is outputted as an output voltage. One of the respective two secondary coils is connected to each other, and an output voltage is taken out from between the others, and is transmitted outside through the cord 32.

Second Embodiment

Next, a second embodiment of the behavior inspection apparatus for an extensible flexible pipe joint according to the present invention is described with reference to FIG. 7.

Figure 7:
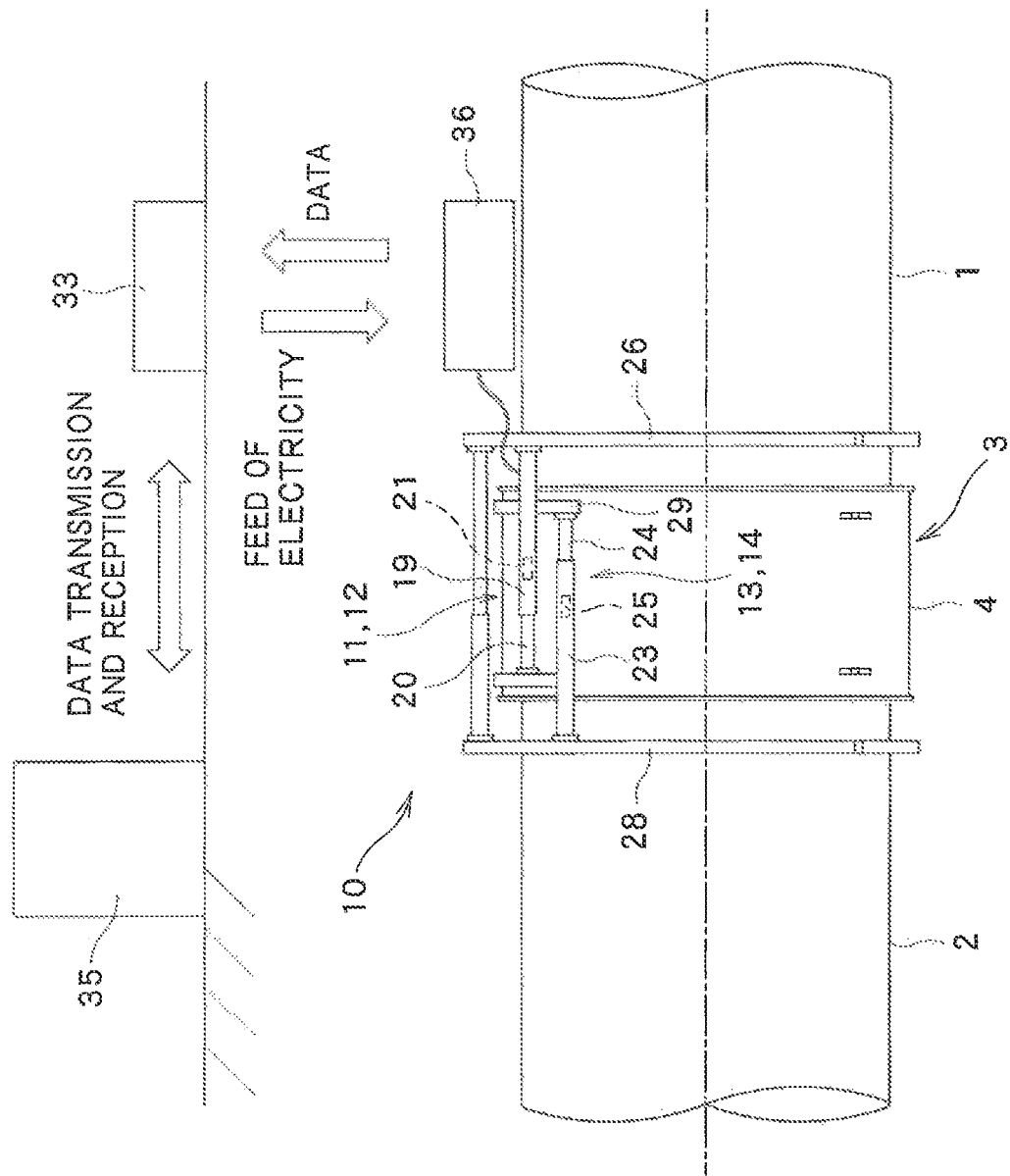
FIG. 7 is a view schematically explaining a structure of the behavior inspection apparatus for an extensible flexible pipe joint according to a second embodiment.

As shown in FIG. 7, the second embodiment is configured such that measurement data (first distance change amount V1) from a first sensor 21 disposed on a first measurement tool 12 and measurement data (second distance change amount V2) from a second sensor 25 disposed on a second measurement tool 14 are wirelessly transmitted to an observer 33 through a transmitter 36, and that the measurement data are further transmitted from the observer 33 to a monitor 35.

In this case, data is transmitted and received between the observer 33 and the monitor 35.

In addition, the observer 33 feeds electricity to the first sensor 21 disposed on the first measurement tool 12 and the second sensor 25 disposed on the second measurement tool 14.

In the embodiment shown in FIG. 7, other parts are substantially the same as those of the first embodiment shown in FIGS. 1 to 6. In FIG. 7, the same parts as those of the first embodiment shown in FIGS. 1 to 6 are indicted by the same symbols, and detailed description thereof is omitted.

In FIG. 7, measurement data are transmitted from the first sensor 21 disposed on the first measurement tool 12 and the second sensor 25 disposed on the second measurement tool 14 to the observer 33 through the transmitter 36, and then the measurement data are transmitted from the observer 33 to the monitor 35.

The monitor 35 computes an extension/contraction degree and an inclination degree of the first pipe 1 with respect to the extensible flexible pipe joint 3, based on a plurality of first distance change amounts V1 measured by the plurality of first measurement tools 12 constituting the first measurement tool group 11. Similarly, the monitor 35 computes an expansion/contraction degree and an inclination degree of the second pipe 2 with respect to the extensible flexible pipe joint 3, based on a plurality of second distance change amounts V2 measured by the plurality of second measurement tools 14 constituting the second measurement tool group 13.

According to this embodiment, the observer 33 is provided in the vicinity of the extensible flexible pipe joint 3 embedded in the ground. The observer 33 can feed electricity to the first sensor 21 of the first measurement tool 12 and the second sensor 25 of the second measurement tool 14, and measurement data can be transmitted from the first sensor 21 and the second sensor 25 to the observer 33. In addition, the measurement data from the observer 33 can be transmitted to the monitor 35 located remotely from the observer 33, and the monitor 33 can precisely and reliably compute an extension/contraction degree and an inclination degree of the first pipe 1 with respect to the extensible flexible pipe joint 3 and an extension/contraction degree and an inclination degree of the second pipe 2 with respect to the extensible flexible pipe joint 3.

Third Embodiment

Next, a third embodiment of the behavior inspection apparatus for extensible flexible pipe joint according to the present invention is described with reference to FIG. 8.

Figure 8:
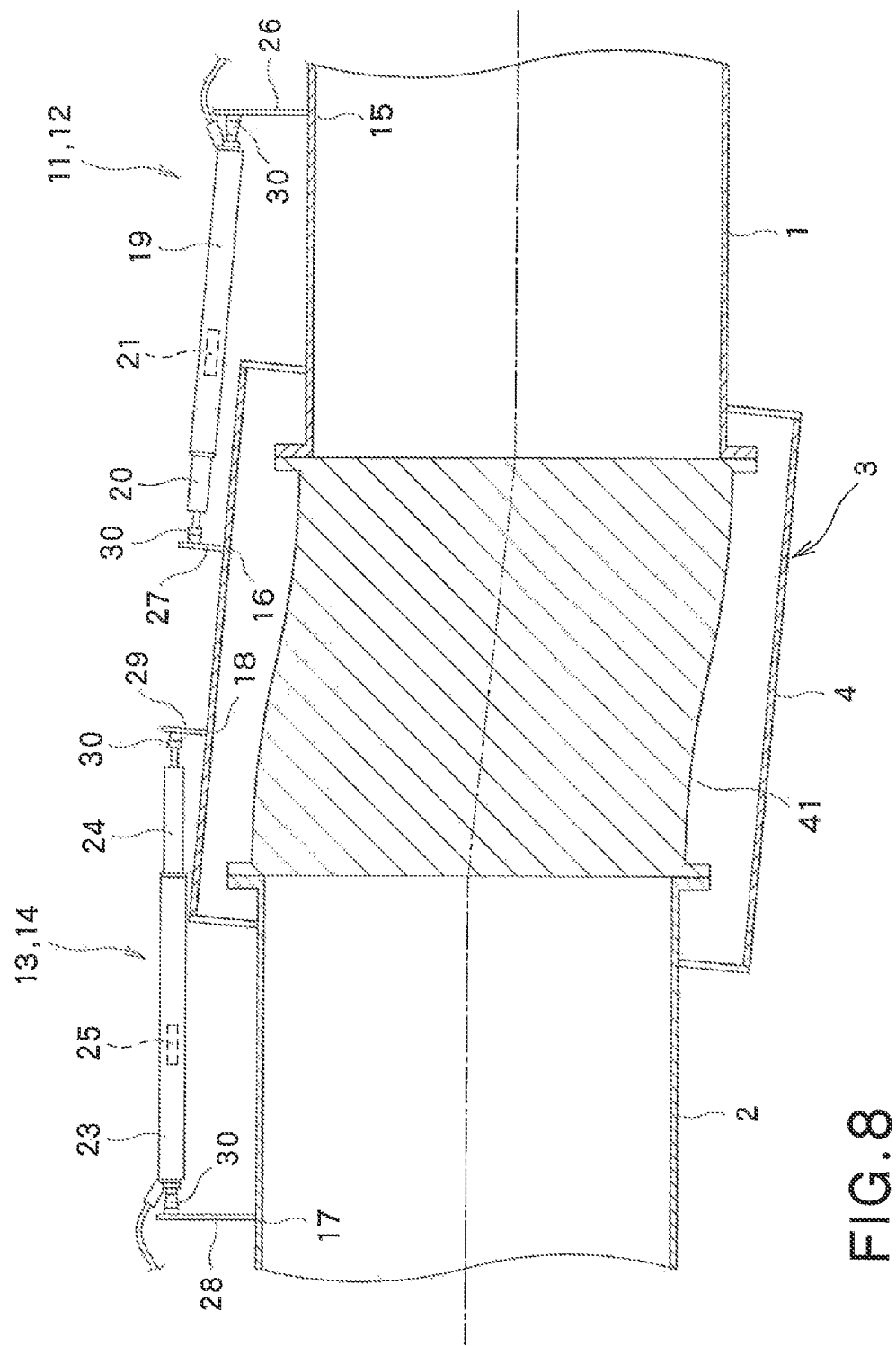
FIG. 8 is a view schematically explaining a structure of the behavior inspection apparatus for an extensible flexible pipe joint according to a third embodiment.

As shown in FIG. 8, a first pipe 1 and a second pipe 2 are connected to each other through a flexible pipe body 41 such as a bellows pipe. A sleeve 4 surrounding the flexible pipe body 41 is disposed on an outer circumference of the flexible pipe body 41.

In addition, the sleeve 4 is coupled to the first pipe 1 and the second pipe 2.

In FIG. 8, the sleeve 4 and the flexible pipe body 41 constitute an extensible flexible pipe joint 3.

In the third embodiment shown in FIG. 8, the same parts as those of the first embodiment shown in FIGS. 1 to 6 are indicted by the same symbols, and detailed description thereof is omitted.

As shown in FIG. 8, the behavior inspection apparatus 10 includes a first measurement tool group 11 having a set of first measurement tools 12, and a second measurement tool group 13 having a set of second measurement tools 14.

In FIG. 8, as the plurality of first measurement tools 12 constituting the first measurement tool group 11 and as the plurality of second measurement tools 14 constituting the second measurement tool group 13, only one measurement tool 2 and only one measurement tool 14 are shown. In the actual apparatus, a plurality of, e.g., four first measurement tools 12 are arranged at equal intervals therebetween in a circumferential direction of the extensible flexible pipe joint 3, the first pipe 1 and the second pipe 2. Similarly, a plurality of, e.g., four second measurement tools 14 are arranged at equal intervals therebetween in the circumferential direction. The number of first measurement tools 12 constituting the first measurement tool group 11 must be three or more. As long as the circumferential arrangement positions are determined, it is not necessary for the measurement tools to be at angularly equal intervals therebetween.

The first measurement tool 12 measures a first distance change amount V1 that is a change amount of a distance between a first pipe position 15 in the first pipe 1 and a first reference position 16 of the sleeve 4 of the extensible flexible pipe joint 3. The second measurement tool 14 measures a second distance change amount V2 that is a change amount of a distance between a second pipe position 17 in the second pipe 2 and a second reference position 18 of the sleeve 4. The first reference position 16 and the second reference position 18 of the sleeve 4 of the extensible flexible pipe joint 3 are located at ring positions of a plane perpendicular to an axis line of the sleeve 4, and their position data on the sleeve 4 have been already known.

The first measurement tool 12 includes a first cylinder 19 whose one end is attached to the first pipe position 15, a first cylinder receiver 20 whose one end is attached to the first reference position 16 and whose the other end is telescopically moved with respect to the other end of the first cylinder 19, and a first sensor 21 (see FIG. 2) which electrically measures the first distance change amount V1 based on a telescopic degree of the first cylinder 19 with respect to the first cylinder receiver 20 and transmits measurement data. The second measurement tool 14 includes a second cylinder 23 whose one end is attached to the second pipe position 17, a second cylinder receiver 24 whose one end is attached to the second reference position 18 and whose the other end is telescopically moved with respect to the other end of the second cylinder 23, and a second sensor 25 which electrically measures the second distance change amount V2 based on a telescopic degree of the second cylinder 23 with respect to the second cylinder receiver 24.

An annular part 26 of an annular plate shape is disposed on an outer circumference of the first pipe position 15 of the first pipe 1, and an annular part 27 of an annular plate shape is disposed on an outer circumference of the first reference position 16 of the sleeve 4. Similarly, an annular part 28 of an annular plate shape is disposed on an outer circumference of the the second pipe position 17 of the second pipe 2, and an annular part 29 of an annular plate shape is disposed on an outer circumference of the second reference position 18 of the sleeve 4. Universal joints 30 are attached to the annular parts 26, 27, 28 and 29. One end of the first cylinder 19 is attached to the annular part 26 through the universal joint 30. One end of the first cylinder receiver 20 is attached to the annular part 27 through the universal joint 30. One end of the second cylinder 21 is attached to the annular part 28 through the universal joint 30. One end of the second cylinder receiver 22 is attached to the annular part 29 through the universal joint 30. The universal joints 30 function in such a manner that the first cylinder 19, the first cylinder receiver 20, the second cylinder 21 and the second cylinder receiver 22 move to follow smoothly, precisely displacements of the first pipe 1 and the second pipe 2 with resect to the extensible flexible pipe joint 3. The first cylinder 19, the first cylinder receiver 20, the second cylinder 21 and the second cylinder receiver 22 are attached to the respective annular parts 26, 27, 28 and 29 through the universal joints 30. Thus, due to the universal joints 30, the first cylinder 19, the first cylinder receiver 20, the second cylinder 21 and the second cylinder receiver 22 can have right postures to maintain their telescopic relationship at all times. As a result, it is possible to obtain measurement data of the first distance change amount V1 and the second distance change amount V2.

The first sensor 21 and the second sensor 25 transmit the measurement data of the first distance change amount V1 and the second distance change amount V2 to an observer 33 installed on the ground through a cable 32 embedded in the ground.

In place of the cable 32, the first sensor 21 and the second sensor 25 can wirelessly transmit the measurement data of the first distance change amount V1 and the second distance change amount V2 to the observer 33.

The observer 33 computes an extension/contraction degree and an inclination degree of the first pipe 1 with respect to the extensible flexible pipe joint 3 based on the plurality of first distance change amounts V1 measured by the plurality of first measurement tools 12 constituting the first measurement tool group 11. Similarly, the observer 33 computes an extension/contraction degree and an inclination degree of the second pipe 2 with respect to the extensible flexible pipe joint 3 based on the plurality of second distance change amounts V2 measured by the plurality of second measurement tool 14 constituting the second measurement tool group 13.

The observer 33 may further transmit the measurement data from the observer 33 to a monitor 35, without computing the extension/contraction degree and the inclination degree of the first pipe 1 or the extension/contraction degree and the inclination degree of the second pipe 2 based on the first distance change amounts V1 or the second distance change amounts V2, and the monitor 35 may compute the extension/contraction degree and the inclination degree of the first pipe 1 or the extension/contraction degree and the inclination degree of the second pipe 2 (see FIG. 7).

Fourth Embodiment

Next, a fourth embodiment of the behavior inspection apparatus for an extensible flexible pipe joint according to the present invention is described with reference to FIG. 9.

Figure 9:
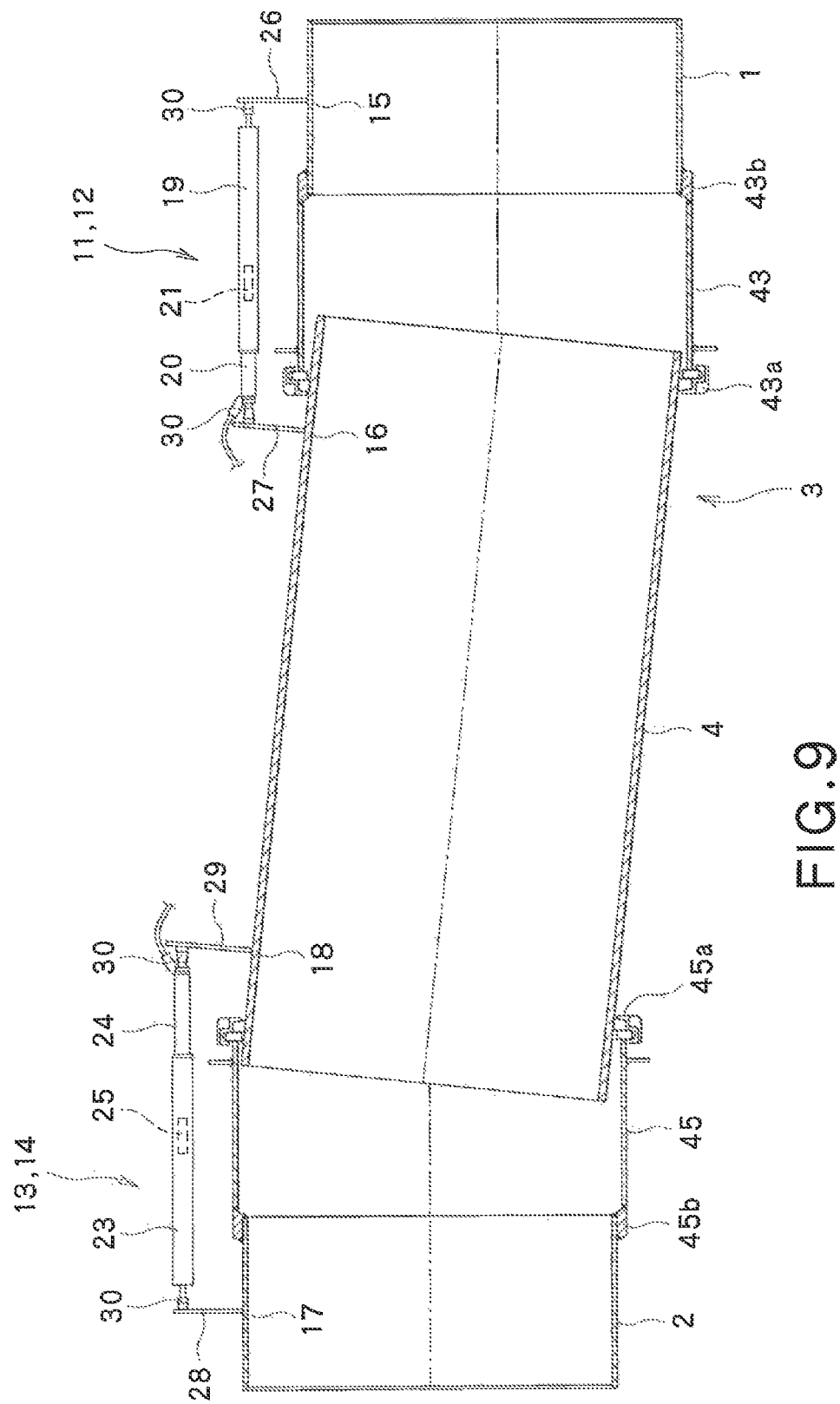
FIG. 9 is a view schematically explaining a structure of the behavior inspection apparatus for an extensible flexible pipe joint according to a fourth embodiment.

As shown in FIG. 9, a first sleeve 1 and a sleeve 4 are connected through a first coupling pipe 43, and a second pipe 2 and the sleeve 4 are connected through a second coupling pipe 45.

In this case, a seal member 43a is interposed between the sleeve 4 and the first coupling pipe 43, and a seal member 43b is interposed between the first coupling pipe 43 and the first pipe 1. In addition, a seal member 45a is interposed between the sleeve 4 and the second coupling pipe 45, and a seal member 45b is interposed between the second coupling pipe 45 and the second pipe 2. In addition, in FIG. 9, the sleeve 4, the first coupling pipe 43, the second coupling pipe 45, the seal members 43a and 43b and the seal members 45a and 45b constitute an extensible flexible pipe joint 3.

In the fourth embodiment shown in FIG. 9, the same parts as those of the first embodiment shown in FIGS. 1 to 6 are indicted by the same symbols, and detailed description thereof is omitted.

As shown in FIG. 9, the behavior inspection apparatus 10 includes a first measurement tool group 11 having a set of first measurement tools 12, and a second measurement tool group 13 having a set of second measurement tools 14.

In FIG. 9, as the plurality of first measurement tools 12 constituting the first measurement tool group 11 and as the plurality of second measurement tools 14 constituting the second measurement tool group 13, only one measurement tool 2 and only one measurement tool 14 are shown. In the actual apparatus, a plurality of, e.g., four first measurement tools 12 are arranged at equal intervals therebetween in a circumferential direction of the extensible flexible pipe joint 3, the first pipe 1 and the second pipe 2. Similarly, a plurality of, e.g., four second measurement tools 14 are arranged at equal intervals therebetween in the circumferential direction. The number of first measurement tools 12 constituting the first measurement tool group 11 must be three or more. As long as the circumferential arrangement positions are determined, it is not necessary for the measurement tools to be at angularly equal intervals therebetween.

The first measurement tool 12 measures a first distance change amount V1 that is a change amount of a distance between a first pipe position 15 in the first pipe 1 and a first reference position 16 of the sleeve 4 of the extensible flexible pipe joint 3. The second measurement tool 14 measures a second distance change amount V2 that is a change amount of a distance between a second pipe position 17 in the second pipe 2 and a second reference position 18 of the sleeve. The first reference position 16 and the second reference position 18 of the sleeve 4 of the extensible flexible pipe joint 3 are located at ring positions (annular positions) of a plane perpendicular to an axis line of the sleeve 4, and their position data on the sleeve 4 have been already known.

The first measurement tool 12 includes a first cylinder 19 whose one end is attached to the first pipe position 15, a first cylinder receiver 20 whose one end is attached to the first reference position 16 and whose the other end is telescopically moved with respect to the other end of the first cylinder 19, and a first sensor 21 (see FIG. 2) which electrically measures the first distance change amount V1 based on a telescopic degree of the first cylinder 19 with respect to the first cylinder receiver 20 and transmits measurement data. The second measurement tool 14 includes a second cylinder 23 whose one end is attached to the second pipe position 17, a second cylinder receiver 24 whose one end is attached to the second reference position 18 and whose the other end is telescopically moved with respect to the other end of the second cylinder 23, and a second sensor 25 which electrically measures the second distance change amount V2 based on a telescopic degree of the second cylinder 23 with respect to the second cylinder receiver 24.

An annular part 26 of an annular plate shape is disposed on an outer circumference of the first pipe position 15 of the first pipe 1, and an annular part 27 of an annular plate shape is disposed on an outer circumference of the first reference position 16 of the sleeve 4. Similarly, an annular part 28 of an annular plate shape is disposed on an outer circumference of the the second pipe position 17 of the second pipe 2, and an annular part 29 of an annular plate shape is disposed on an outer circumference of the second reference position 18 of the sleeve 4. Universal joints 30 are attached to the annular parts 26, 27, 28 and 29. One end of the first cylinder 19 is attached to the annular part 26 through the universal joint 30. One end of the first cylinder receiver 20 is attached to the annular part 27 through the universal joint 30. One end of the second cylinder 21 is attached to the annular part 28 through the universal joint 30. One end of the second cylinder receiver 22 is attached to the annular part 29 through the universal joint 30. The universal joints 30 function in such a manner that the first cylinder 19, the first cylinder receiver 20, the second cylinder 21 and the second cylinder receiver 22 move to follow smoothly, precisely displacements of the first pipe 1 and the second pipe 2 with resect to the extensible flexible pipe joint 3. The first cylinder 19, the first cylinder receiver 20, the second cylinder 21 and the second cylinder receiver 22 are attached to the respective annular parts 26, 27, 28 and 29 through the universal joints 30. Thus, due to the universal joints 30, the first cylinder 19, the first cylinder receiver 20, the second cylinder 21 and the second cylinder receiver 22 can have right postures to maintain their telescopic relationship at all times. As a result, it is possible to obtain measurement data of the first distance change amount V1 and the second distance change amount V2.

The first sensor 21 and the second sensor 25 transmit the measurement data of the first distance change amount V1 and the second distance change amount V2 to an observer 33 installed on the ground through a cable 32 embedded in the ground.

In place of the cable 32, the first sensor 21 and the second sensor 25 can wirelessly transmit the measurement data of the first distance change amount V1 and the second distance change amount V2 to the observer 33.

The observer 33 computes an extension/contraction degree and an inclination degree of the first pipe 1 with respect to the extensible flexible pipe joint 3 based on the plurality of first distance change amounts V1 measured by the plurality of first measurement tools 12 constituting the first measurement tool group 11. Similarly, the observer 33 computes an extension/contraction degree and an inclination degree of the second pipe 2 with respect to the extensible flexible pipe joint 3 based on the plurality of second distance change amounts V2 measured by the plurality of second measurement tool 14 constituting the second measurement tool group 13.

As described below, the observer 33 may further transmit the measurement data from the observer 33 to a monitor 35, without computing the extension/contraction degree and the inclination degree of the first pipe 1 or the extension/contraction degree and the inclination degree of the second pipe 2 based on the first distance change amounts V1 or the second distance change amounts V2, and the monitor 35 may compute the extension/contraction degree and the inclination degree of the first pipe 1 or the extension/contraction degree and the inclination degree of the second pipe 2 (see FIG. 7).

Fifth Embodiment

Next, a fifth embodiment of the behavior inspection apparatus for an extensible flexible pipe joint according to the present invention is described with reference to FIG. 10.

As shown in FIG. 10, a first pipe 1 and a sleeve 4 are connected by a first flexible pipe 47 such as a bellows pipe, and a second pipe 2 and the sleeve 4 are connected by a second flexible pipe 49 such as a bellows pipe.

In FIG. 10, the sleeve 4, the first flexible pipe 47 and the second flexible pipe 49 constitute an extensible flexible pipe joint 3.

In the fifth embodiment shown in FIG. 10, the same parts as those of the first embodiment shown in FIGS. 1 to 6 are indicted by the same symbols, and detailed description thereof is omitted.

As shown in FIG. 10, the behavior inspection apparatus 10 includes a first measurement tool group 11 having a set of first measurement tools 12, and a second measurement tool group 13 having a set of second measurement tools 14.

In FIG. 10, as the plurality of first measurement tools 12 constituting the first measurement tool group 11 and as the plurality of second measurement tools 14 constituting the second measurement tool group 13, only one measurement tool 2 and only one measurement tool 14 are shown. In the actual apparatus, a plurality of, e.g., four first measurement tools 12 are arranged at equal intervals therebetween in a circumferential direction of the extensible flexible pipe joint 3, the first pipe 1 and the second pipe 2. Similarly, a plurality of, e.g., four second measurement tools 14 are arranged at equal intervals therebetween in the circumferential direction. The number of first measurement tools 12 constituting the first measurement tool group 11 must be three or more. As long as the circumferential arrangement positions are determined, it is not necessary for the measurement tools to be at angularly equal intervals therebetween.

The first measurement tool 12 measures a first distance change amount V1 that is a change amount of a distance between a first pipe position 15 in the first pipe 1 and a first reference position 16 of the sleeve 4 of the extensible flexible pipe joint 3. The second measurement tool 14 measures a second distance change amount V2 that is a change amount of a distance between a second pipe position 17 in the second pipe 2 and a second reference position 18 of the sleeve. The first reference position 16 and the second reference position 18 of the sleeve 4 of the extensible flexible pipe joint 3 are located at ring positions of a plane perpendicular to an axis line of the sleeve 4, and their position data on the sleeve 4 have been already known.

The first measurement tool 12 includes a first cylinder 19 whose one end is attached to the first pipe position 15, a first cylinder receiver 20 whose one end is attached to the first reference position 16 and whose the other end is telescopically moved with respect to the other end of the first cylinder 19, and a first sensor 21 (see FIG. 2) which electrically measures the first distance change amount V1 based on a telescopic degree of the first cylinder 19 with respect to the first cylinder receiver 20 and transmits measurement data. The second measurement tool 14 includes a second cylinder 23 whose one end is attached to the second pipe position 17, a second cylinder receiver 24 whose one end is attached to the second reference position 18 and whose the other end is telescopically moved with respect to the other end of the second cylinder 23, and a second sensor 25 which electrically measures the second distance change amount V2 based on a telescopic degree of the second cylinder 23 with respect to the second cylinder receiver 24.

An annular part 26 of an annular plate shape is disposed on an outer circumference of the first pipe position 15 of the first pipe 1, and an annular part 27 of an annular plate shape is disposed on an outer circumference of the first reference position 16 of the sleeve 4. Similarly, an annular part 28 of an annular plate shape is disposed on an outer circumference of the the second pipe position 17 of the second pipe 2, and an annular part 29 of an annular plate shape is disposed on an outer circumference of the second reference position 18 of the sleeve 4. Universal joints 30 are attached to the annular parts 26, 27, 28 and 29. One end of the first cylinder 19 is attached to the annular part 26 through the universal joint 30. One end of the first cylinder receiver 20 is attached to the annular part 27 through the universal joint 30. One end of the second cylinder 21 is attached to the annular part 28 through the universal joint 30. One end of the second cylinder receiver 22 is attached to the annular part 29 through the universal joint 30. The universal joints 30 function in such a manner that the first cylinder 19, the first cylinder receiver 20, the second cylinder 21 and the second cylinder receiver 22 move to follow smoothly, precisely displacements of the first pipe 1 and the second pipe 2 with resect to the extensible flexible pipe joint 3. The first cylinder 19, the first cylinder receiver 20, the second cylinder 21 and the second cylinder receiver 22 are attached to the respective annular parts 26, 27, 28 and 29 through the universal joints 30. Thus, due to the universal joints 30, the first cylinder 19, the first cylinder receiver 20, the second cylinder 21 and the second cylinder receiver 22 can have right postures to maintain their telescopic relationship at all times. As a result, it is possible to obtain measurement data of the first distance change amount V1 and the second distance change amount V2.

The first sensor 21 and the second sensor 25 transmit the measurement data of the first distance change amount V1 and the second distance change amount V2 to an observer 33 installed on the ground through a cable 32 embedded in the ground.

In place of the cable 32, the first sensor 21 and the second sensor 25 can wirelessly transmit the measurement data of the first distance change amount V1 and the second distance change amount V2 to the observer 33.

The observer 33 computes an extension/contraction degree and an inclination degree of the first pipe 1 with respect to the extensible flexible pipe joint 3 based on the plurality of first distance change amounts V1 measured by the plurality of first measurement tools 12 constituting the first measurement tool group 11. Similarly, the observer 33 computes an extension/contraction degree and an inclination degree of the second pipe 2 with respect to the extensible flexible pipe joint 3 based on the plurality of second distance change amounts V2 measured by the plurality of second measurement tool 14 constituting the second measurement tool group 13.

As described below, the observer 33 may further transmit the measurement data from the observer 33 to a monitor 35, without computing the extension/contraction degree and the inclination degree of the first pipe 1 or the extension/contraction degree and the inclination degree of the second pipe 2 based on the first distance change amounts V1 or the second distance change amounts V2, and the monitor 35 may compute the extension/contraction degree and the inclination degree of the first pipe 1 or the extension/contraction degree and the inclination degree of the second pipe 2 (see FIG. 7).

DESCRIPTION OF SYMBOLS

1 First pipe
2 Second pipe
3 Extensible flexible pipe joint
4 Sleeve
5, 6 Seal member
10 Behavior inspection apparatus
11 First measurement tool group
12 First measurement tool
13 Second measurement tool group
14 Second measurement tool
15 First pipe position
16 First reference position
17 Second pipe position
18 Second reference position
19 First cylinder
20 First cylinder receiver
21 First sensor
23 Second cylinder
24 Second cylinder receiver
25 Second sensor
26, 27, 28, 29 Annular part
30 Universal joint
32 Cable
33 Observer
39 Attachment means
41 Flexible pipe body
43 First coupling pipe
45 Second coupling pipe
47 First flexible pipe
49 Second flexible pipe
d Axis-line shift amount

The invention claimed is:

1. A behavior inspection apparatus for an extensible flexible pipe joint connecting a first pipe and a second pipe and including a sleeve, the behavior inspection apparatus comprising:
a first measurement tool group including a set of first measurement tools each of which measures a first distance change amount that is a change amount of a distance between a first pipe position in the first pipe and a first reference position of the sleeve of the extensible flexible pipe joint; and
a second measurement tool group including a set of second measurement tools each of which measures a second distance change amount that is a change amount of a distance between a second pipe poison in the second pipe and a second reference position of the sleeve;
wherein:
the first measurement tool includes a first cylinder whose one end is attached to the first pipe position, a first cylinder receiver whose one end is attached to the first reference position and whose the other end is telescopically moved with respect to the other end of the first cylinder, and a first sensor which electrically measures the first distance change amount based on a telescopic degree of the first cylinder with respect to the first cylinder receiver and transmits measurement data; and
the second measurement tool includes a second cylinder whose one end is attached to the second pipe position, a second cylinder receiver whose one end is attached to the second reference position and whose the other end is telescopically moved with respect to the other end of the second cylinder, and a second sensor which electrically measures the second distance change amount based on a telescopic degree of the second cylinder with respect to the second cylinder receiver and transmits measurement data;
the plurality of first measurement tools constituting the first measurement tool group are arranged at different positions in a circumferential direction of the sleeve, and the plurality of second measurement tools constituting the second measurement tool group are arranged at different positions in the circumferential direction of the sleeve; and
displacement positions of the first pipe and the second pipe with respect to the extensible flexible pipe joint are computed based on the measurement data by the plurality of first sensors of the first measurement tool group and on the measurement data by the plurality of second sensors of the second measurement tool group.

2. The behavior inspection apparatus for an extensible flexible pipe joint according to claim 1, wherein
when the first pipe and the second pipe are connected by the extensible flexible pipe joint, the first measurement tool group and the second measurement tool group are installed.

3. The behavior inspection apparatus for an extensible flexible pipe joint according to claim 1, wherein
when the first pipe and the second pipe have been previously connected by the extensible flexible pipe joint, the first measurement tool group and the second measurement tool group are installed afterwards.

4. The behavior inspection apparatus for an extensible flexible pipe joint according to claim 1, wherein
the first cylinder and the first cylinder receiver is attached respectively to the first pipe and the sleeve through universal joints, and the second cylinder and the second cylinder receiver is attached respectively to the second cylinder and the sleeve through universal joints.

5. The behavior inspection apparatus for an extensible flexible pipe joint according to claim 1, wherein
the first sensor and the second sensor are either sensors of a slide resistance type or sensors of a differential transformer type.

6. The behavior inspection apparatus for an extensible flexible pipe joint according to claim 1, wherein
the first sensor and the second sensor transmit the measurement data through a wire.

7. The behavior inspection apparatus for an extensible flexible pipe joint according to claim 1, wherein
the first sensor and the second sensor transmit the measurement data wirelessly.

8. The behavior inspection apparatus for an extensible flexible pipe joint according to claim 1, wherein
a seal member is interposed between the sleeve and the first pipe, and a seal member is interposed between the sleeve and the second pipe.

9. The behavior inspection apparatus for an extensible flexible pipe joint according to claim 1, wherein the sleeve is disposed on an outer circumference of a flexible pipe body connected to the first pipe and the second pipe.

10. The behavior inspection apparatus for an extensible flexible pipe joint according to claim 1, wherein
the first pipe and the sleeve are connected through a first coupling pipe, and the second pipe and the sleeve are connected through a second coupling pipe.

11. The behavior inspection apparatus for an extensible flexible pipe joint according to claim 1, wherein
the first pipe and the sleeve are connected through a first flexible pipe, and the second pipe and the sleeve are connected through a second flexible pipe.

12. The behavior inspection apparatus for an extensible flexible pipe joint according to claim 1, wherein
an observer is connected to the first sensor and the second sensor, the observer receiving the measurement data from the first sensor and the second sensor and feeding electricity to the first sensor and the second sensor.

13. The behavior inspection apparatus for an extensible flexible pipe joint according to claim 11, wherein
a monitor is connected to the observer, the monitor receiving the measurement data from the observer.

14. A behavior inspection method for an extensible flexible pipe joint connecting a first pipe and a second pipe and including a sleeve, the behavior inspection method comprising:
preparing a first measurement tool group including a set of first measurement tools each of which measures a first distance change amount that is a change amount of a distance between a first pipe position in the first pipe and a first reference position of the sleeve of the extensible flexible pipe joint, and a second measurement tool group including a set of second measurement tools each of which measures a second distance change amount that is a change amount of a distance between a second pipe poison in the second pipe and a second reference position of the sleeve; and
arranging and attaching the plurality of first measurement tools constituting the first measurement tool group at different positions in a circumferential direction of the sleeve, and arranging and attaching the plurality of second measurement tools constituting the second measurement tool group at different positions in the circumferential direction of the sleeve;
wherein:
the first measurement tool includes a first cylinder whose one end is attached to the first pipe position, a first cylinder receiver whose one end is attached to the first reference position and whose the other end is telescopically moved with respect to the other end of the first cylinder, and a first sensor which electrically measures the first distance change amount based on a telescopic degree of the first cylinder with respect to the first cylinder receiver and transmits measurement data, and the second measurement tool includes a second cylinder whose one end is attached to the second pipe position, a second cylinder receiver whose one end is attached to the second reference position and whose the other end is telescopically moved with respect to the other end of the second cylinder, and a second sensor which electrically measures the second distance change amount based on a telescopic degree of the second cylinder with respect to the second cylinder receiver and transmits measurement data; and
displacement positions of the first pipe and the second pipe with respect to the extensible flexible pipe joint are computed based on the measurement data by the plurality of first sensors of the first measurement tool group and on the measurement data by the plurality of second sensors of the second measurement tool group.

15. The behavior inspection method for an extensible flexible pipe joint according to claim 14, wherein
when the first pipe and the second pipe are connected by the extensible flexible pipe joint, the first measurement tool group and the second measurement tool group are installed and attached.

16. The behavior inspection method for an extensible flexible pipe joint according to claim 14, wherein
when the first pipe and the second pipe have been previously connected by the extensible flexible pipe joint, only an upper part of the extensible flexible pipe joint, the first pipe and the second pipe close to the ground surface are exposed, and the first measurement tool group and the second measurement tool group are installed and attached afterwards.

* * * * *